United States Patent
Herrero (10) Patent No.: US 9,742,587 B2
(45) Date of Patent: Aug. 22, 2017

(54) NEGATIVE ACKNOWLEDGMENT OF TUNNELED ENCAPSULATED MEDIA

(71) Applicant: Oracle International Corporation, Redwood Shores, CA (US)

(72) Inventor: Rolando Herrero, Derry, NH (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 216 days.

(21) Appl. No.: 14/811,907

(22) Filed: Jul. 29, 2015

(65) Prior Publication Data

US 2017/0033946 A1   Feb. 2, 2017

(51) Int. Cl.
| | |
|---|---|
| G06F 15/16 | (2006.01) |
| H04L 12/46 | (2006.01) |
| H04L 29/06 | (2006.01) |
| H04L 1/00 | (2006.01) |
| H04L 1/16 | (2006.01) |

(52) U.S. Cl.
CPC ............ H04L 12/4633 (2013.01); H04L 1/00 (2013.01); H04L 1/1621 (2013.01); H04L 65/608 (2013.01)

(58) Field of Classification Search
CPC ... H04L 1/00; H04L 12/4633; H04L 43/0829; H04L 43/0835; H04L 43/0852; H04L 47/10; H04L 47/2416; H04L 65/1016; H04L 65/60; H04L 65/608; H04L 65/80; H04L 67/42; H04W 76/022
See application file for complete search history.

(56) References Cited

U.S. PATENT DOCUMENTS

| | | | |
|---|---|---|---|
| 6,275,471 B1 * | 8/2001 | Bushmitch | H04L 1/1851 348/E7.071 |
| 6,907,460 B2 | 6/2005 | Loguinov et al. | |
| 7,085,273 B1 | 8/2006 | Chuah | |

(Continued)

FOREIGN PATENT DOCUMENTS

WO        03069838 A1    8/2003

OTHER PUBLICATIONS

Suherman, Suherman and Al-Akaidi, Marwan. "An efficient negative acknowledgement-based transport protocol in 802.11 media streaming." Appearing in International Journal of Ad Hoc and Ubiquitous Computing 16(3). Jan. 2013. pp. 1-12.*

(Continued)

*Primary Examiner* — Christopher Biagini
(74) *Attorney, Agent, or Firm* — Miles & Stockbridge P.C.

(57) ABSTRACT

A system for performing negative acknowledgment for real-time communications establishes a tunnel by a tunneling server with a tunneling client of a user equipment (UE). The system receives a request from the UE to enable the negative acknowledgment for an inner socket of the tunnel and sends a response back to the UE to indicate that the negative acknowledgment is enabled for the inner socket. The system receives a plurality of frames from the UE on the inner socket, where each frame includes a sequence number. The system, for each frame received, determines an inter-frame delay using the sequence number, and based on the inter-frame delay determines one or more missing frames. The system then sends an identity of the missing frames to the UE on the inner socket.

20 Claims, 6 Drawing Sheets

(56) References Cited

U.S. PATENT DOCUMENTS

| | | | |
|---|---|---|---|
| 7,649,909 B1* | 1/2010 | Archard | H04L 12/4633 370/477 |
| 8,341,480 B2 | 12/2012 | Kashima et al. | |
| 8,483,133 B2 | 7/2013 | Navratil et al. | |
| 8,837,289 B2 | 9/2014 | Darmawan et al. | |
| 2003/0026258 A1* | 2/2003 | Takatani | H04L 29/06 370/392 |
| 2005/0160345 A1 | 7/2005 | Walsh et al. | |
| 2006/0291452 A1* | 12/2006 | Velagaleti | H04L 1/1671 370/352 |
| 2010/0008245 A1* | 1/2010 | Viger | H04L 47/193 370/252 |
| 2012/0170445 A1 | 7/2012 | Perumanam et al. | |
| 2012/0195288 A1* | 8/2012 | Oh | H04W 36/14 370/331 |
| 2013/0283037 A1 | 10/2013 | Katz et al. | |
| 2016/0381699 A1* | 12/2016 | Rubin | H04L 67/2809 370/329 |

OTHER PUBLICATIONS

Suherman Suherman et al., "An efficient negative acknowledgement-based transport protocol in 802.11 media streaming", International Journal of Ad Hoc and Ubiquitous Computing, vol. 16 Issue 3, Aug. 2014, last downloaded Apr. 7, 2015.

Suherman Suherman et al., "A Transport Layer Protocol for Uplink WiMAX Video Streaming", International Journal of Multimedia and Ubiquitous Engineering, vol. 10, No. 1 (2015), pp. 19-32, http://www.sersc.org/journals/IJMUE/vol10_no1_2015/3.pdf.

Yogesh Iyer et al., "STCP: A Generic Transport Layer Protocol for Wireless Sensor Networks", last downloaded Jul. 28, 2015, http://www.utd.edu/~venky/pubs/STCP-ic3n.pdf.

Dzmitry Kliazovich et al., "A Delayed-ACK Scheme for MAC-Level Performance Enhancement of Wireless LANs", last downloaded Jul. 28, 2015, http://disi.unitn.it/~klezovic/papers/DAWL_ict'04.pdf.

Gaetano Guida et al., "LTE and 4G: a comparison with WiMAX", Network Infrastructures A.A. 2010-2011, last downloaded Jul. 28, 2015, http://net.infocom.uniroma1.it/corsi/Network%20Infrastructures/materiale/LTE%20vs%20WiMAX.pdf.

Jim Gemmell et al., "In Search of an API for Scalable Reliable Multicast", Microsoft Research Advanced Technology Division Microsoft Corporation, Technical Report MSR-TR-97-17, Jun. 23, 1997, last downloaded Jul. 28, 2015, http://citeseerx.ist.psu.edu/viewdoc/download?doi=10.1.1.66.680&rep=rep1&type=pdf.

H. Schulzrinne et al.; "RTP: A Transport Protocol for Real-Time Applications";Jul. 2003; 89 pages.

3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

NEGATIVE ACKNOWLEDGMENT OF TUNNELED ENCAPSULATED MEDIA

FIELD

One embodiment is directed generally to a communications network, and in particular, to the transmission of encapsulated media within a tunnel over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system for performing negative acknowledgment for real-time communications. The system establishes a tunnel by a tunneling server with a tunneling client of a user equipment (UE). The system receives a request from the UE to enable the negative acknowledgment for an inner socket of the tunnel and sends a response back to the UE to indicate that the negative acknowledgment is enabled for the inner socket. The system receives a plurality of frames from the UE on the inner socket, where each frame includes a sequence number. The system, for each frame received, determines an inter-frame delay using the sequence number, and based on the inter-frame delay determines one or more missing frames. The system then sends an identity of the missing frames to the UE on the inner socket.

DETAILED DESCRIPTION

One embodiment is a system that performs negative acknowledgment of encapsulated media on a per channel/socket basis within a tunneled architecture. The system adds a sequence number to each frame, and the receiving server executes an algorithm to determine a frame loss event using moving averages/window. When a frame loss event is triggered, the receiving server provides a negative acknowledgment to the source of the frame, and the missing frame is retransmitted.

Figure 1:
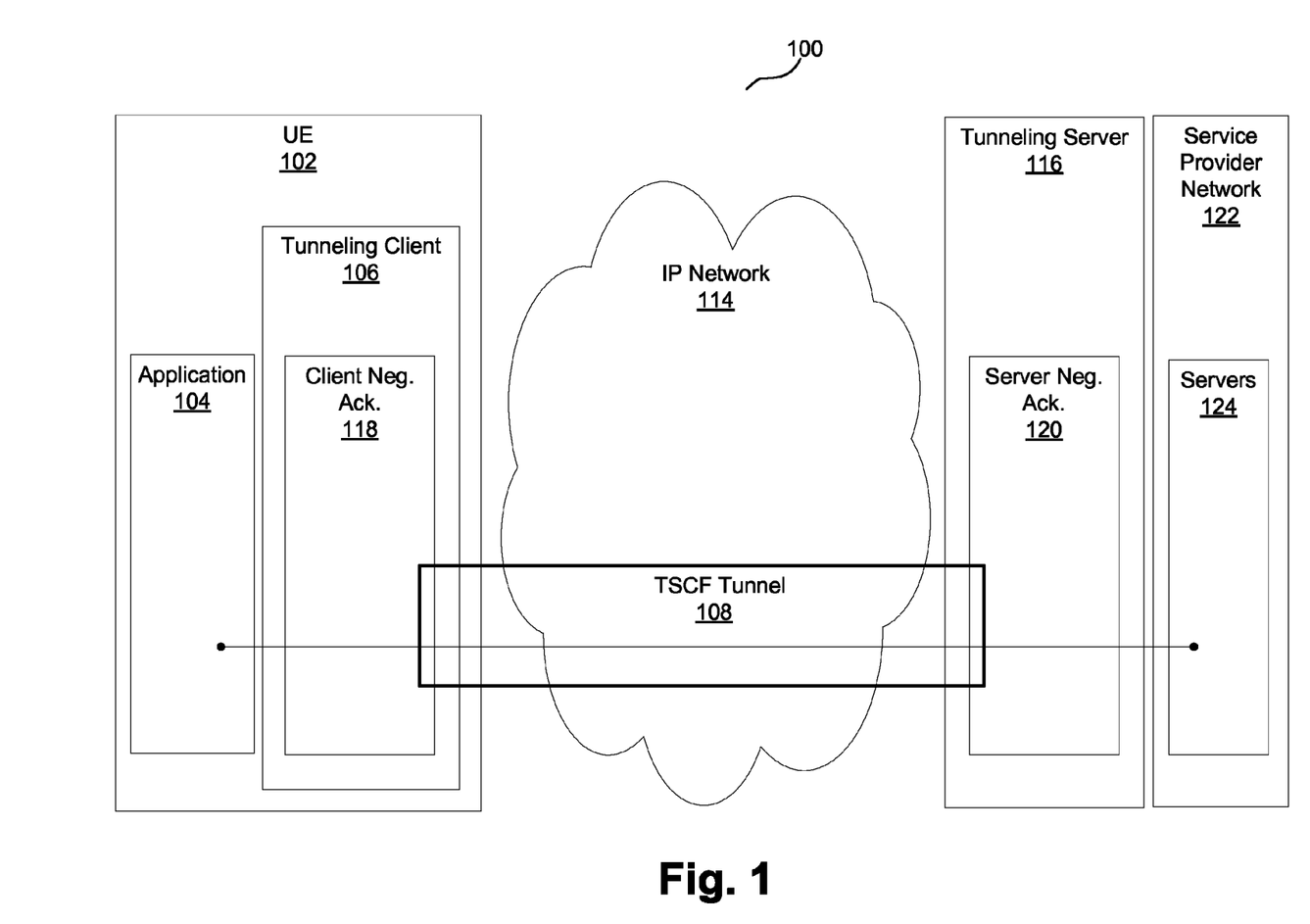
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application 104 that may be a SIP based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the internet. The session border controllers (e.g., implemented by tunneling server 116) at the edge of the network terminate and control the tunnels before passing the secure traffic into the service core of service provider network 122.

Figure 2:
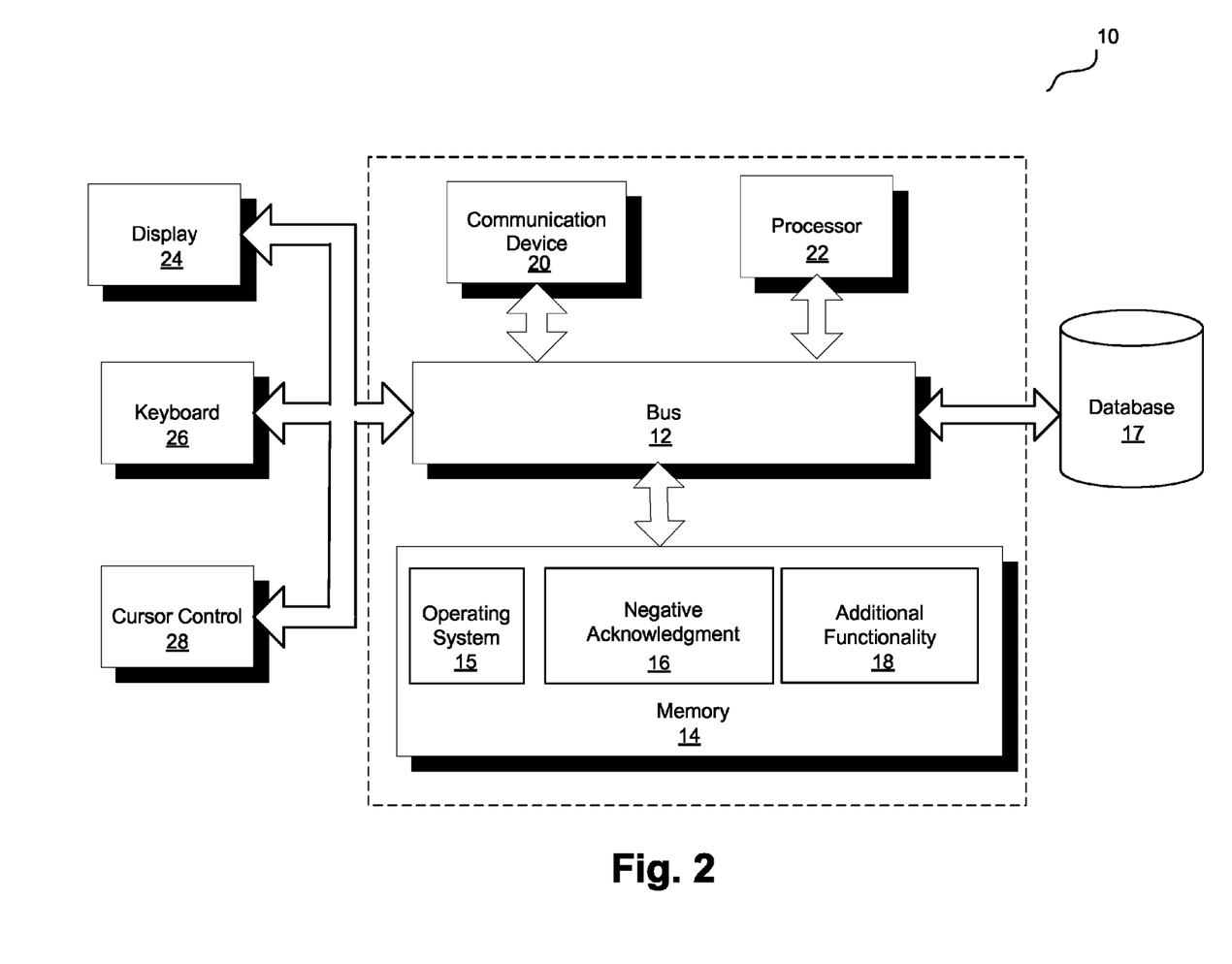
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a negative acknowledgment module 16 for providing negative acknowledgment of frames not received on a per socket basis, and all other functionality disclosed herein. In one example embodiment, negative acknowledgment module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for negative acknowledgment module 16 and additional functional modules 18.

In one embodiment, negative acknowledgment module 16 and/or additional functional modules 18 may include several modules to provide the negative acknowledgment functionality. The modules in one embodiment include a tunneling module that establishes a tunnel with a tunneling client of a user equipment and a missing frame monitoring module for dropped/missing frames and executes the negative acknowledgment functionality at an inner transport layer of the tunnel when dropped frames are detected.

Referring again to FIG. 1, with known systems, TSCF tunnel 108 may encapsulate different types of traffic ranging from pure data to real-time media. In general, data and real-time media are subject to different Quality of Service ("QoS") requirements. For example, data may be sensitive to integrity while real-time media may be sensitive to latency. In a tunneling configuration, encapsulated (i.e., in a packet/frame) media is typically communicated according to the real-time transport protocol ("RTP" as provided, for example, in IETF RFC 3550).

Figure 3:
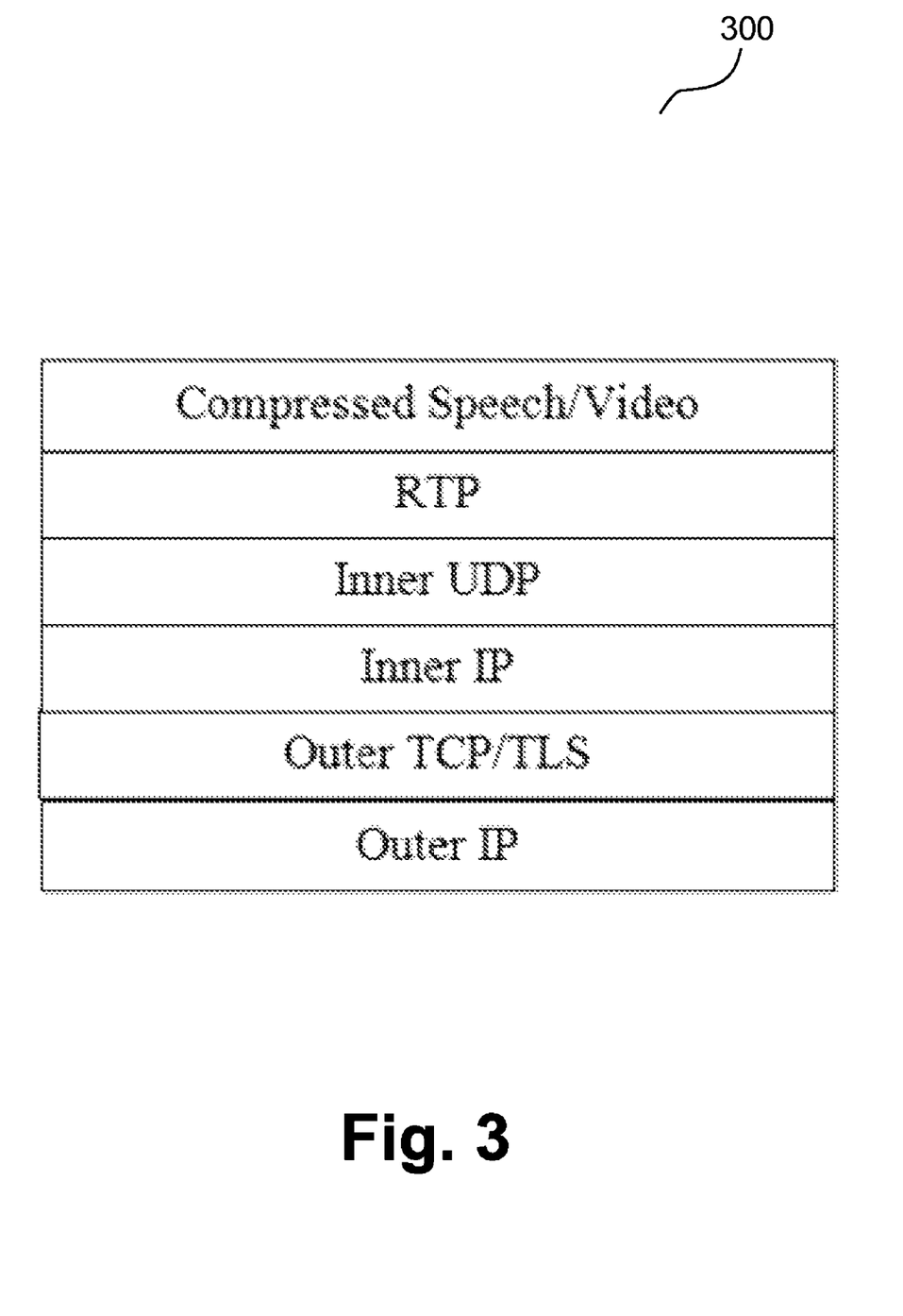
FIG. 3 illustrates example protocol layers in a tunneling configuration for encapsulating media traffic according to an embodiment.

In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

In many packet data networks, where individual packets take many different routes to the ultimate destination, the loss of packets can be problematic. Packet loss is typically caused by network congestion. For RTC in particular, packet loss can negatively impact the user experience. Known solutions to improve the quality of RTC in a tunneling environment by avoiding packet loss typically involve proactive forward error correction ("FEC") using the transmission of redundancy or repair frames/packets. For example, each packet can be sent multiple times. Although this scheme generally addresses the packet loss problems, it also introduces a compulsive increase of the transmission rate that sometimes leads to unwanted congestion even when repair packets are not needed.

In contrast, embodiments implement dynamic and selective retransmission of encapsulated media frames. When enabled, embodiments automatically detect missing packets and, through negative acknowledgment, request their retransmission. Embodiments are implemented on a per channel/socket basis of tunnel 108 (i.e., built into the transport layer of the tunneling architecture). Therefore, embodiments do not require intervention or awareness of any of the application layer protocol, such as RTP.

One embodiment provides TSCF SDKs that support an application programming interface ("API") so that application 104 can enable negative acknowledgment functionality for a specific inner socket. For example, application 104 may enable negative acknowledgment at tunneling client 106 for an inner socket by executing a corresponding "tsc_setsockopt" API (i.e., a set socket API) with a corresponding new socket option when an inner socket is created. The TSCF SDK provides a Berkeley software distribution ("BSD")-like socket API that can be used to send and receive encapsulated media using the tsc_sendto and tsc_recvfrom functions, respectively.

In one embodiment, both tunneling client 106 and tunneling server 16 can detect missing frames that belong to the inner socket under analysis and request retransmissions whenever possible and necessary.

In one embodiment, if needed and once enabled, tunneling client 106 can communicate with tunneling server 116 via a CM service message type to enable or disable the negative acknowledgment on any given socket. Further, embodiments update the inner traffic to include a sequence number on every transport frame that is subjected to the negative acknowledgment.

In one embodiment, a CM service request allows both tunneling client 106 and tunneling server 116 to signal when retransmission of one or more frames is needed. When the negative acknowledgment is enabled, tunneling client 106 notifies application 104, if configured, by means of the "tsc_notification_enable" API.

Figure 4:
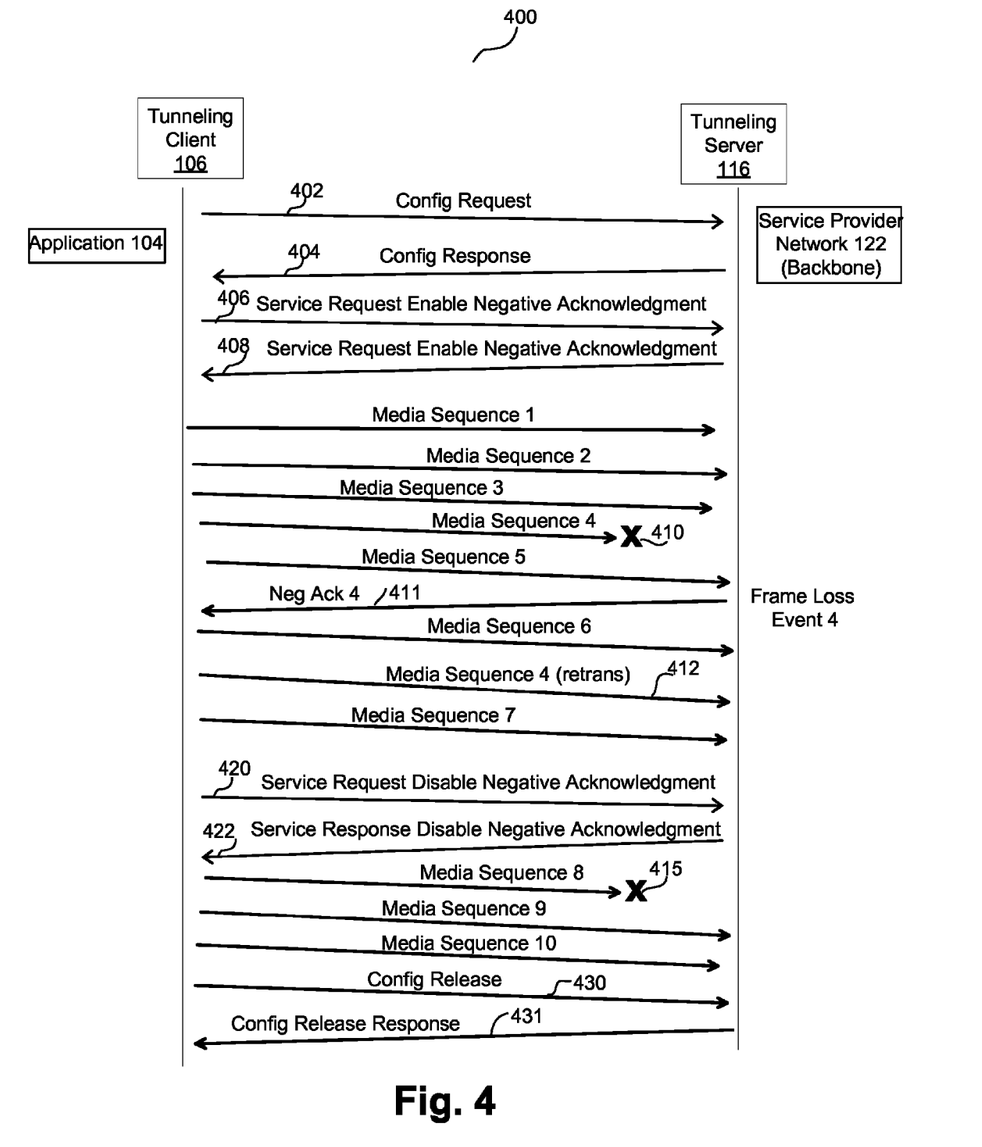
FIG. 4 is an example message sequence diagram including the sequence of messages exchanged between a tunneling client and a tunneling server for performing negative acknowledgment according to some embodiments.

FIG. 4 is an example message sequence diagram 400 including the sequence of messages exchanged between tunneling client 106 and tunneling server 116 for performing negative acknowledgment according to some embodiments. FIG. 4 includes network elements such as tunneling client 106 in communication with application 104, and tunneling server 116 in communication with service provider network 122, as described herein with reference to FIG. 1.

At 402, tunneling client 106 sends a configuration request message to tunneling server 116 to establish TSCF tunnel 108, and at 404 tunneling server 116 responds to the configuration request message of tunneling client 106 with a configuration response message. Configuration request and response messages allow for tunneling client 106 to obtain configuration information for TSCF tunnel 108 from tunneling server 116, as described in, for example, 3GPP TR 33.830 V0.5.0. In one embodiment, from the application perspective, application 104 at UE 102 creates TSCF tunnel 108 by executing a "tsc_ctrl_new_tunnel" API, and the configuration response message is sent to tunneling server 116 in response to the execution of this API.

Upon completing the exchange of request/response messages, tunneling client 106 and tunneling server 116 may use TSCF tunnel 108 for performing RTC and communicating signaling traffic and media traffic. In one embodiment, when inner signaling and media sockets are needed to place a call (e.g., for communicating SIP call control traffic or RTP media traffic), application 104 creates these sockets on TSCF tunnel 108 by executing a "tsc_socket" API. A socket is created by determining a socket type (e.g., datagram vs. stream) and a tunnel on which the socket should be created. In one embodiment, when a socket is created, application 104 binds the socket by executing a "tsc_bind" API. The bind function assigns a specific transport port (e.g., TCP or UDP) to the socket. This port is later used as a source port of all traffic generated by the socket. In one embodiment, if an inner socket is created in TSCF tunnel 108, there is a binding at tunneling server 116 that links the internal IP address of TSCF tunnel 108 to that socket.

At 406, application 104 enables negative acknowledgment functionality for a specific inner socket in TSCF tunnel 108 by executing a "tsc_setsockopt" API on the corresponding inner socket. The execution of a "tsc_setsockopt" API causes negative acknowledgment module 118 to send a TSCF service request message to tunneling server 116 to enable negative acknowledgment functionality for the inner socket at tunneling server 116.

At 408, server negative acknowledgment module 120 at tunneling server 116 receives the service request message, determines if tunneling server 116 can comply with the request, and answers back to client negative acknowledgment module 118 with a TSCF service response message to confirm that negative acknowledgment functionality is enabled.

Subsequently, tunneling client 106 transmits media traffic frames that belong to the inner socket, received from application 104, over tunnel 108, where each frame incorporates sequence numbers. For example, as shown in FIG. 4, the frames can be numbered "media sequence 1", "media sequence 2", etc.

When a specific frame is not received, such as the frame "media sequence 4" at 410 in the example of FIG. 4, a service request ("neg ack 4") at 411 indicating the range of sequences of frames to retransmit is sent by tunneling server 116. If only one sequence number is missing rather than multiple frames, the "range" will include the same number. A "frame loss event", described in detail below, is generated by either client 106 or server 116 when an expected frame is not received after a determined time period, which triggers the service request (e.g., "Frame Loss Event 4" in FIG. 4). Tunneling client 106 responds back with a service response (not shown) and proceeds to retransmit the indicated frames ("media sequence 4 (retrans)" at 412).

In order to disable the negative acknowledgment functionality, at 420, tunneling client 106 issues a service request and waits for tunneling server 116 to confirm by means of a service response at 422. Therefore, as shown in the example of FIG. 4, future frames not received, such as "media sequence 8" at 415, will not be retransmitted. Further, in order to remove tunnel 108, at 430 tunneling client 106 issues a configuration release request, and at 432, tunneling server 116 responds back with a configuration release response to comply.

One embodiment supports negative acknowledgment by providing "Service_Type" TLV values to indicate negative acknowledgment enablement and disablement, and a "Sequence Range" TLV value to indicate the range of frames to retransmit. Table 1 below provides example TSCF TLVs for providing negative acknowledgment functionality according to some embodiments.

them. Typically, a media frame includes of a sequence of headers with a payload that includes compressed media as shown in the following example frame:

| Inner IP | Inner UDP | RTP | Media |
|---|---|---|---|

The first most significant nibble of the first byte of the IP header is 0x4 or 0x6 to denote IPv4 or IPv6, respectively. In order to transparently add a sequence number to each frame, a new sequence header is pre-appended such that the overall frames are as follows:

| Seq. Header | Inner IP | Inner UDP | RTP | Media |
|---|---|---|---|---| and the sequence header is as follows:

| 0x73 | SN |
|---|---| where "0x73" is the first byte that is used to indicate that this is a sequence header and "SN" is a 2-byte sequence number. Sequence numbers are cyclical, so if SN is 65535 (0xffff) then the next incremental sequence number is 0 (0x0000).

In one embodiment, in order to trigger a frame loss event, the endpoints (i.e., tunneling client 106 and tunneling server 116) dynamically calculate the inter-frame delay ("$IF_{delay}$"). One embodiment determines the delay using a moving average ("MA") obtained when frame "n" is received as follows:

$$IF_{delay} = \frac{\sum_{k=0}^{N-1} IF_{n-k}}{N}$$

where "$IF_i$" is the inter-frame delay corresponding to frame "i" with respect to frame "i−1", and "N" is the maximum number of frames to be included in the average. If either frame i or frame i−1 are missing, $IF_i$ is skipped from the average.

Figure 5A:
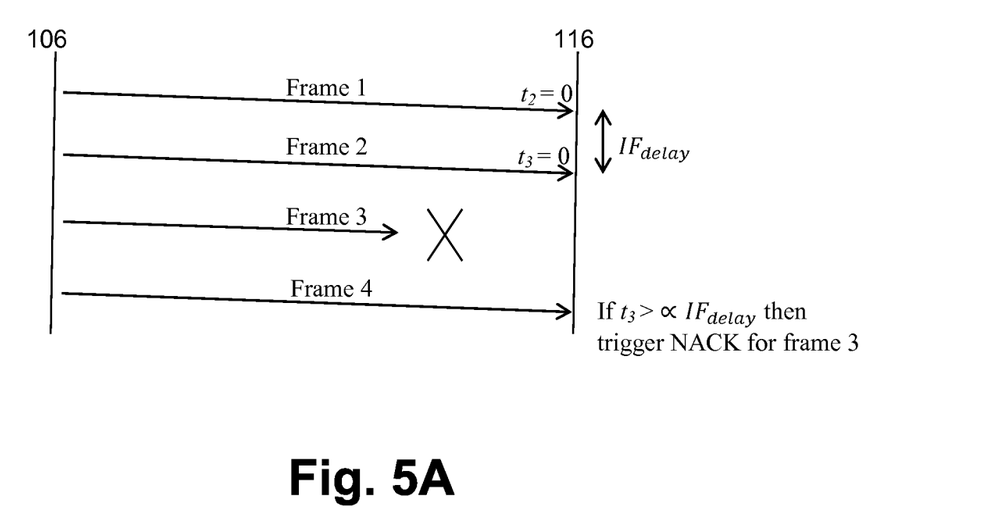
FIGS. 5A and 5B are call flows between a tunneling client and a tunneling server that illustrate the two triggering conditions for a frame loss event in accordance with one embodiment.
Figure 5B:
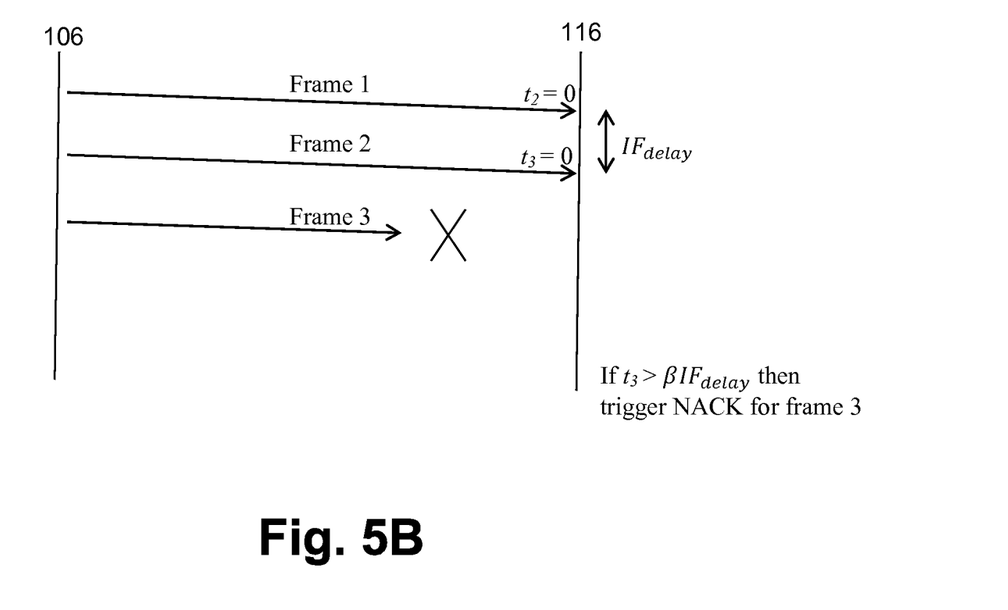

In general the frame loss event is typically triggered when one of two conditions occur in one embodiment. FIGS. 5A and 5B are call flows between tunneling client 106 and tunneling server 116 that illustrate the two triggering conditions for a frame loss event in accordance with one embodiment.

TABLE 1

| TLV TYPE | | | SHORT/ LONG FORMAT | VALUE TYPE | LENGTH | NOTES |
|---|---|---|---|---|---|---|
| NAME | VALUE | SEMANTICS | | | | |
| Service_Type | 27 | Service Type | Short | Unsigned integer | 1 byte | Enable_Negative_Acknowledgment = 20 Disable_Negative_Acknowledgment = 21 |
| Sequence Range | 44 | Sequence Range | Short | Unsigned integer | 4 bytes | Low 2 bytes for initial sequence value and high 2 bytes for final sequence value. If only one sequence number is to be specified both initial and final numbers must be identical |

In one embodiment, inner socket media frames sent by either tunneling client 106 or tunneling server 116, whenever the negative acknowledgment functionality is enabled, include a sequence number that is mandatory to identify Referring to FIG. 5A, when a frame i is received, its timer $t_i$ is cleared and a timer $t_{i+1}$ is started. If frame j is received and j>I+1 and $t_{i+1} > \alpha IF_{delay}$, where $\alpha = 1.1$, then a frame loss event for frame i+1 is triggered.

Referring to FIG. 5B, if frame i is not received and $t_i > \beta IF_{delay}$, where $\beta=2.2$, then a frame loss event for frame i is triggered.

As disclosed above, in one embodiment, in order to enable or disable negative acknowledgment of frames with a source or destination address that belongs to a specific inner socket, application 104 sets the right option using via "tsc_socket" APIs, and more specifically by setting the appropriate socket option as shown in the following example pseudo-code:

```
int enable_nack = 1;
int result = tsc_setsockopt(rtp_socket, SOL_SOCKET,
SO_TSC_NACK,
         (char *)&enable_nack, sizeof(int));
``` where the "enable_nack" variable above signals whether its support is enabled (1) or disabled (0).

If "tsc_setsockopt" returns −1, the option was not set correctly. If it returns 0, if was set correctly but negative acknowledgment will not be officially enabled until they are negotiated. A new notification "tsc_notification_nack" can be used to notify client 106 about this functionality. The following pseudo-code illustrates how the notification is enabled and what the notification callback function looks like in accordance with one embodiment:

```
tsc_notification_enable(handle, tsc_notification_nack, nack_notification, NULL);
void nack_notification(tsc_notification_data *notification)
{
    tsc_notification_nack_info_data *nack_data = (tsc_notification_nack_ info_data *)notification->data;
    if (nack_data && nack_data->available == tsc_bool_true) {
        if (nack_data->enabled == tsc_bool_true) {
            printf("nack enabled notification on socket %d\n", nack_data->socket);
        } else {
            printf("nack notification playing on socket %d\n", nack_data->socket);
        }
    } else {
        printf("nack notification not allowed on socket %d\n", nack_data->socket);
    }
}
```

The fourth NULL parameter in "tsc_notification_enable" is an opaque/private data pointer that can be recovered in the "tsc_notification_data" structure upon callback.

One embodiment that is implemented using an SBC, such as the Acme Packet 4500 from Oracle Corp., provides a configuration object "tscf-interface" that includes a parameter "assigned-services" with a keyword "NACK" to enable negative acknowledgment at tunneling server 116. Table 2 below provides an example of the tscf-interface configuration object according to one embodiment.

TABLE 2

| Parameter Name | Extensible markup language ("XML") tag | Data Type and Default | Value Ranges/Possible Values | Required or Optional (for feature to work)? |
|---|---|---|---|---|
| assigned-services | assigned-services | String: Blank | NACK to enable negative acknowledgment | Optional |

The following functionality provides an example interface configuration for providing negative acknowledgment according to one embodiment:

```
tscf-interface
    realm-id         access
    state            enabled
    max-tunnels          1000
    local-address-pools  Ip
    assigned-services    SIP, NACK
    tscf-port
        address              192.168.31.1
        port             2105
        transport-protocol  TCP
        tls-profile
        rekey-profile
    last-modified-by    admin@console
    last-modified-date  2015-02-03 00:00:00
```

The following is an example extensible markup language ("XML") functionality for providing negative acknowledgment according to one embodiment:

```
<tscfInterface realmID='access'
    state='enabled'
    maxTunnels='10000'
    assignedServices='SIP,NACK'
    options=''
    lastModifiedBy='admin@console'
    lastModifiedDate='2015-02-03 00:00:00'
    objectId='33'>
```

-continued

```
<key>access</key>
<localAddressPool name='lp'/>
<tscfPort address='192.168.31.1'
    port='2105'
    transProtocol='TCP'
    tlsProfile=''
    rekeyProfile=''
</tscfInterface>
```

Figure 6:
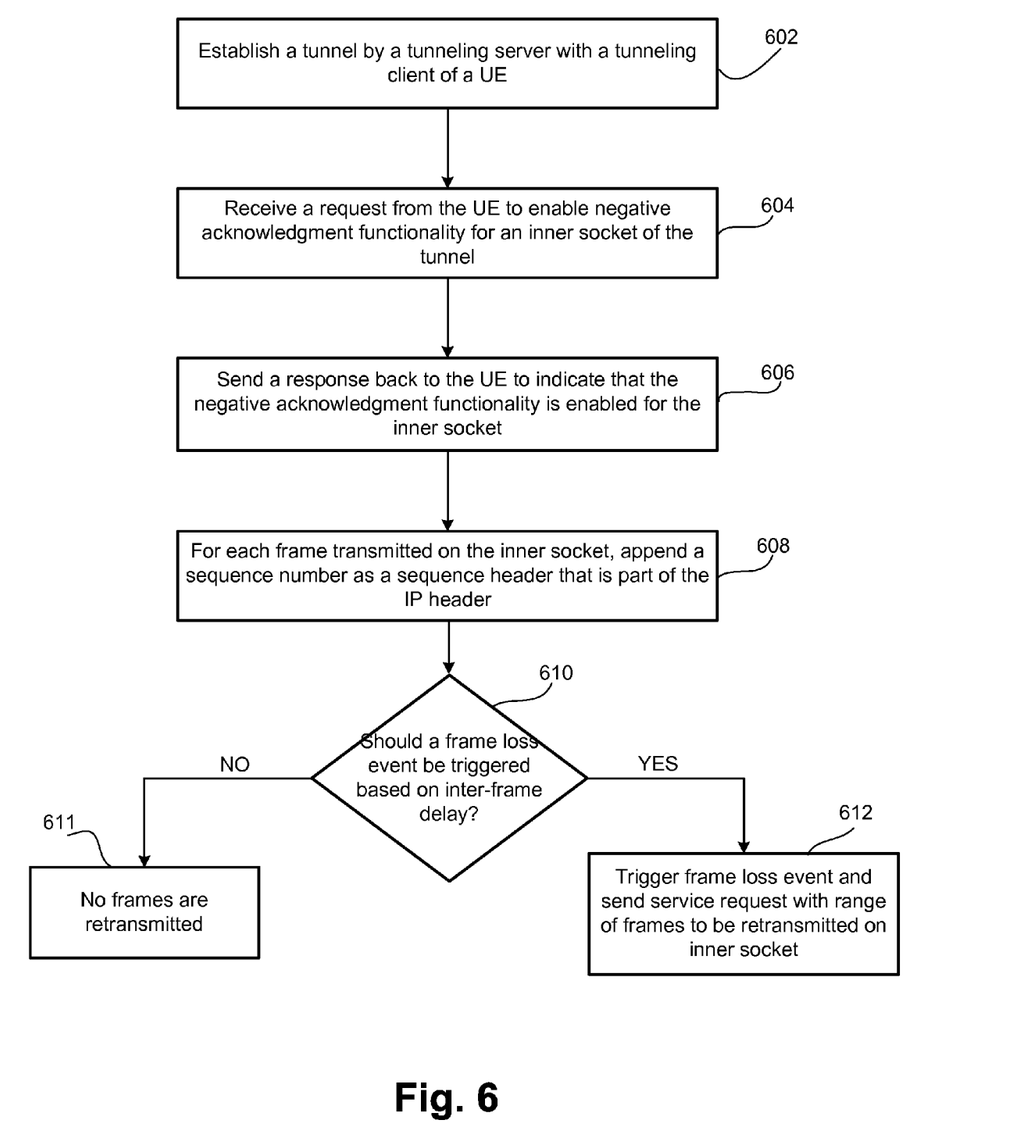
FIG. 6 is a flow diagram of a negative acknowledgment module of FIG. 2 and/or a tunneling client and tunneling server of FIG. 1 when performing negative acknowledgment in accordance with embodiments of the present invention.

FIG. 6 is a flow diagram of negative acknowledgment module 16 of FIG. 2 and/or tunneling client 106 and tunneling server 116 of FIG. 1 when performing negative acknowledgment in accordance with embodiments of the present invention. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, tunneling client 106 and tunneling server 116 establish TSCF tunnel 108. Tunnel 108 can include multiple inner sockets, such as a separate inner socket for speech data, video data, etc.

At 604, client negative acknowledgment module 118 at tunneling client 106 sends a TSCF service request to tunneling server 116 to enable negative acknowledgment functionality for a specific inner socket in TSCF tunnel 108. In one embodiment, client negative acknowledgment module 118 sends the request when application 104 executes an API to enable the negative acknowledgment functionality for the inner socket. A request can be made for any or all inner sockets of tunnel 108, but the functionality is implemented on a per socket basis.

At 606, server negative acknowledgment module 120 at tunneling server 116 sends a TSCF service response back to client negative acknowledgment module 118 to confirm that negative acknowledgment functionality is enabled for the inner socket.

At 608, for each frame transmitted on the inner socket, a sequence number is appended as a sequence header that is part of the IP header. Therefore, every frame received includes the sequence number. In one embodiment, for each specific stream and for each direction there is a different 16-bit sequence number ("SN") counter. The range of the SN is 0 through 65535, and after 65535 the next value is 0 again. For each stream there are two directions (client 106 to server 116, and vice versa) and corresponding counters.

At 610, for each received frame on the inner socket, it is determined if a frame loss event should be triggered by determining the inter-frame delay. In one embodiment, the inter-frame delay is calculated for every received frame. If no at 610, no frames are retransmitted at 611. If yes at 610, at 612 the frame loss event is triggered. The frame loss event causes a service request to be sent that indicates a range of sequences of frames to be retransmitted. The missing/dropped frames will then be retransmitted on the inner socket.

As disclosed, embodiments establish a tunnel and enable negative acknowledgment for one or more of the inner sockets of the tunnel. Each frame on the inner socket will include a sequence number. Further, for each frame receive on the inner socket, a frame loss event is triggered if conditions related to an inter-frame delay are met. The frame loss event causes the missing frames to be retransmitted.

Embodiments provide a reactive approach to the problem of missing/dropped frames. Embodiments detect missing frames and automatically request their retransmissions without application level intervention. Embodiments can improve media quality and also minimize the transmission rate, which leads to a more optimal use of the network.

Embodiments perform the negative acknowledgment on an encapsulated traffic basis, where specific media channels (i.e., sockets for, e.g., speech or video) are subjected to negative acknowledgment while others are not based on per client application settings via APIs. For example, some video codecs are extremely sensitive to packet loss and negative acknowledgment provides a substantial quality improvement. On the other hand, speech codecs typically incorporate good packet loss concealment mechanisms that make them more robust against loss and do not require negative acknowledgment. Embodiments allow for the negative acknowledgment to be applied to the video codecs only.

As another example, if there are two types of traffic inside a tunnel (i.e., SIP signaling and RTP media), embodiments allow for enabling negative acknowledgment on the SIP socket only and leaving the RTP socket unaffected. This is because reliability is critical to signaling and can be provided by the negative acknowledgment. On the other hand, negative acknowledgment also introduces latency that affects media quality and therefore it is not worth enabling it on the RTP socket. Further, in embodiments, the negative acknowledgment is integrated to the tunneling APIs, allowing activation as well as notification.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform negative acknowledgment for real-time communications (RTC), the negative acknowledgment comprising:
    establishing a tunnel by a tunneling server with a tunneling client of a user equipment (UE);
    receiving a request from the UE to enable the negative acknowledgment for an inner socket of the tunnel;
    sending a response back to the UE to indicate that the negative acknowledgment is enabled for the inner socket;
    receiving a plurality of frames from the UE on the inner socket, wherein each frame comprises a sequence number; and
    for each frame received, determining an inter-frame delay using the sequence number;
    based on the inter-frame delay, determining one or more missing frames; and
    sending an identity of the missing frames to the UE on the inner socket.

2. The computer readable medium of claim 1, wherein the tunnel is configured according to a tunneled services control function (TSCF) standard, the request is a TSCF service request message, and the response is a TSCF service response message.

3. The computer readable medium of claim 1, wherein the UE sends the request when an application at the UE executes an application programming interface (API) to enable the negative acknowledgment for the inner socket.

4. The computer readable medium of claim 1, wherein the determining an inter-frame delay occurs at the tunneling server.

5. The computer readable medium of claim 1, further comprising, in response to sending the identity of the missing frames, receiving a retransmission of the missing frames.

6. The computer readable medium of claim 1, wherein the determining an inter-frame delay comprises determining a moving average for each frame received.

7. The computer readable medium of claim 1, the negative acknowledgment further comprising appending a sequence number to each frame transmitted to the UE on the inner socket.

8. A method of performing negative acknowledgment for real-time communications (RTC), the method comprising:
    establishing a tunnel by a tunneling server with a tunneling client of a user equipment (UE);
    receiving a request from the UE to enable the negative acknowledgment for an inner socket of the tunnel;

sending a response back to the UE to indicate that the negative acknowledgment is enabled for the inner socket;

receiving a plurality of frames from the UE on the inner socket, wherein each frame comprises a sequence number; and for each frame received, determining an inter-frame delay using the sequence number;

based on the inter-frame delay, determining one or more missing frames; and sending an identity of the missing frames to the UE on the inner socket.

9. The method of claim 8, wherein the tunnel is configured according to a tunneled services control function (TSCF) standard, the request is a TSCF service request message, and the response is a TSCF service response message.

10. The method of claim 8, wherein the UE sends the request when an application at the UE executes an application programming interface (API) to enable the negative acknowledgment for the inner socket.

11. The method of claim 8, wherein the determining an inter-frame delay occurs at the tunneling server.

12. The method of claim 8, further comprising, in response to sending the identity of the missing frames, receiving a retransmission of the missing frames.

13. The method of claim 10, wherein the determining an inter-frame delay comprises determining a moving average for each frame received.

14. The method of claim 10, further comprising appending a sequence number to each frame transmitted to the UE on the inner socket.

15. A tunneling server comprising:
a processor; and
a non-transitory storage device coupled to the processor that stores instructions that, when executed by the processor, implementing modules comprising:

a tunneling module that establishes a tunnel by a tunneling server with a tunneling client of a user equipment (UE) and, in response to receiving a request from the UE to enable negative acknowledgment for an inner socket of the tunnel, sends a response back to the UE to indicate that the negative acknowledgment is enabled for the inner socket; and a missing frame monitoring module that receives a plurality of frames from the UE on the inner socket, wherein each frame comprises a sequence number, and for each frame received determines an inter-frame delay using the sequence number and, based on the inter-frame delay, determines one or more missing frames and sends an identity of the missing frames to the UE on the inner socket.

16. The server of claim 15, wherein the tunnel is configured according to a tunneled services control function (TSCF) standard, the request is a TSCF service request message, and the response is a TSCF service response message.

17. The server of claim 15, wherein the UE sends the request when an application at the UE executes an application programming interface (API) to enable the negative acknowledgment for the inner socket.

18. The server of claim 15, the monitoring module further comprising, in response to sending the identity of the missing frames, receiving a retransmission of the missing frames.

19. The server of claim 15, wherein the determines the inter-frame delay comprises determining a moving average for each frame received.

20. The server of claim 15, further comprising appending a sequence number to each frame transmitted to the UE on the inner socket.

* * * * *